United States Patent [19]

Scharf et al.

[11] 4,447,572

[45] May 8, 1984

[54] FIRE RETARDANT POLYAMIDE

[75] Inventors: Daniel J. Scharf, East Amherst; Charles S. Ilardo, Tonawanda; Willis T. Schwartz, Grand Island; Gideon Salee, Williamsville, all of N.Y.

[73] Assignee: Occidental Chemical Corporation, Niagara Falls, N.Y.

[21] Appl. No.: 318,771

[22] Filed: Nov. 6, 1981

[51] Int. Cl.$^3$ .......................... C08K 5/02; C08K 5/06; C08K 5/34; C08L 77/02
[52] U.S. Cl. ...................................... 524/371; 524/84; 524/94; 524/111; 524/341; 524/467; 524/469; 525/183; 525/185; 525/420
[58] Field of Search ............... 525/183, 185, 420, 425, 525/428; 524/467, 464, 469, 94, 111, 341, 371

[56] References Cited

U.S. PATENT DOCUMENTS

| | | | |
|---|---|---|---|
| 3,630,988 | 12/1971 | Deyrup | 524/467 |
| 3,808,171 | 4/1974 | Mohajer | 524/467 |
| 4,247,450 | 1/1981 | Corny et al. | 524/467 |
| 4,293,662 | 10/1981 | Heydenreich et al. | 525/183 |

Primary Examiner—Allan Lieberman
Attorney, Agent, or Firm—James F. Tao; Arthur S. Cookfair

[57] ABSTRACT

Polyamides, flame retarded with a halogenated derivative and blended with a polymer blend resin being at least partially incompatible and having a lower melt viscosity than the polyamide, to improve the arc tracking resistance of the polyamide, are disclosed. The polyamides are particularly useful in the manufacture of flame retarded electrical components.

20 Claims, No Drawings

FIRE RETARDANT POLYAMIDE

BACKGROUND OF THE INVENTION

This invention is related to flame retardant polyamide compositions having improved physical properties, excellent molding characteristics and improved arc tracking resistance.

Polyamides represent a family of commercially available polymers characterized by the presence of recurring amide groups in the polymer chain and generally noted for their excellent physical properties for a variety of end uses including the formulation of molding compositions. Of the polyamides, Nylon 6, produced by the polymerization of e-caprolactam, and Nylon 66, produced by the condensation reaction of adipic acid and hexamethylene diamine, account for a major share of commercial polyamide molding compositions.

Various means have been proposed for imparting a flame-resistant character to polyamides—these means, include the incorporation into the polyamide composition of halogenated products to which certain inorganic oxides, such as those derived from cadmium, arsenic, bismuth and antimony are frequently added (French Pat. No. 1,568,952 and U.S. Pat. No. 4,247,450). The use of halogenated products to impart fire-resistance to polyamides is well known; U.S. Pat. No. 3,403,036 to Hindersinn et al describes the incorporation of bis(hexachlorocyclopentadieno)cyclooctane, optionally in combination with a suitable metal oxide, in nylon compositions. U.S. Pat. No. 4,194,072 describes the incorporation of bis(hexachlorocyclopentadieno)cyclooctane in formulations of Nylon 6, Nylon 66 and Nylon 612 with selected metal oxides. However, it has been found that articles manufactured from these compositions of the prior art exhibit an unacceptable arc tracking resistance and in numerous applications, in particular for the electrical and electronics industry, the compositions cannot meet commercial requirements.

SUMMARY OF THE INVENTION

It has now been found that polyamide compositions, comprising a major proportion of polyamide or mixtures thereof and a minor proportion of an at least partially incompatible polymer blend resin having a melt viscosity lower than that of the polyamide proportion, fire retarded with a halogenated derivative and with or without metal oxide and/or other additives, provide fire retardant molding compositions having a substantial improvement in arc track resistance than had been previously possible utilizing halogenated derivative fire retardants.

The polyamide compositions of this invention may be conveniently fabricated into various shapes or articles of manufacture using conventional techniques such as molding or casting and the like, with or without additional fire retardants, fillers, reinforcing agents or other additives. It has been found that the superior arc tracking resistance of these polyamide compositions render them particularly suitable for use in a wide variety of electrical and electronic applications.

DETAILED DESCRIPTION OF THE INVENTION

The compositions of the instant invention in addition to the polyamide contain, in percentage of the total weight of the composition, from about 5 to about 30% of a halogen derivative flame retardant and from about 1 to about 20% of a polymer blend resin. Generally the composition contains from about 30 to about 90% by weight polyamide.

The polyamide can be chosen from amongst the different polymers of this type which are available. They can be products obtained by the polycondensation of diacids and of diamines, or by homo or copoly condensation of amino acids or also by polymerization of Lactams. By way of illustration, there may be mentioned especially the polyhexamethylene adipamides and the polycaprolactams. Nylon 6, Nylon 11, Nylon 12, Nylon 66, Nylon 611, Nylon 612 and mixtures thereof are representative and particularly suitable.

Halogenated derivative denotes essentially the chlorinated and brominated derivatives of monocyclic or polycyclic hydrocarbons of aliphatic or aromatic character. Amongst these products are included octabromodiphenyl oxide, decabromodiphenyl oxide, tetra brominated bisphenol, decabromotoluene, polybrominated polystyrenes such as Pyrochex 68 PB, alkylene tetrabromophthalimides such as Saytex BT 93 and the like, the chlorinated derivatives of diphenyl and/or a chlorinated organic compounds of the formula

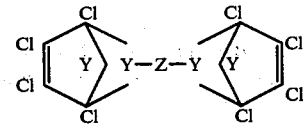

wherein Y is selected from the group consisting of chlorine, fluorine, alkyl and alkoxy, Z is a tetravalent cyclic hydrocarbon having at least 5 carbon atoms, Z may be substituted by lower alkyl of 1 to 6 carbon atoms, chlorine or fluorine. The alkyl and alkoxy radicals mentioned generally have 1 to 10 carbon atoms and preferably are of 1 to 6 carbon atoms. Z is a cyclic hydrocarbon of 5 to 18 carbon atoms and from 1 to 5 cyclic structures. When Z is a plurality of cyclic structures, they are fused, that is, share carbon atoms. These compounds are Diels-Alder adducts of chlorinated cyclopentadiene. Generally such compounds will have a melting point above about 250 degrees Celsius, a vapor pressure of less than about 0.10 millimeters of mercury at 197 degrees Celsius and a chlorine content of at least about 40 percent. Suitable compounds are described in detail in U.S. Pat. Nos. 3,403,036 and 4,000,114, the disclosures of which are incorporated by reference herein. Such compounds may be made by adducting (Diels Alder reaction) one mole of a polyunsaturated cycloaliphatic or heterocyclic compound and two or more moles of a polyhalogenated cyclopentadiene of the formula

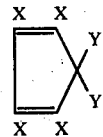

X and Y have the same definition as previously stated. The polyunsaturated cycloaliphatic compound mentioned above contains 5 to 18 carbon atoms, has 1 to 5 cyclic structures and when more than one, the cyclic structures are fused and at least two sites of carbon to carbon unsaturation which may be either ethylenic or acetylenic.

Illustrative of the polyhalogenated cyclopentadienes suitable for use in this invention are hexachlorocyclopentadiene, 5,5-dimethoxytetrachlorocyclopentadiene, 5,5-difluorotetrachlorocyclopentadiene, 5,5-dibromotetrachlorocyclopentadiene, and 5,5-diethoxytetrachlorocyclopentadiene.

Satisfactory polyunsaturated aliphatic compounds for use in preparing the Diels-Alder adduct with

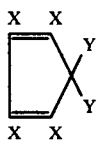

include cycloaliphatic compounds exemplified by but not limited to methyl cyclopentadiene, cyclopentadiene, dicyclopentadiene, bicyclo(2.2.1)heptadiene, 1,5-cyclooctadiene, cyclodecadiene and cyclododecadiene. Suitable polyunsaturated heterocyclic compounds include the furans and thiophenes.

The preparation of 1,4,7,10-dimethanocycloocta-1,2,3,4,7,8,9,10,13,13,14,14-dodecachloro-1,4,4a,5,6-,6a,7,10,10a,11,12,12-dodecahydro(1,2,5,6)dibenzene is disclosed by Ziegler and Froitzheim-Kuhlhorn, Annalen, vol. 589, page 157 (1954). This compound's structure is believed to be

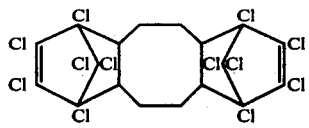

For convenience this compound will be referred to by the short title of 1,5 COD. The adduct is prepared by condensing two moles of hexachlorocyclopentadiene with one mole of 1,5-cyclooctadiene in xylene at a temperature below 200 degrees centigrade. The adduct melts at above 350 degrees centigrade and has a vapor pressure of 0.006 millimeter of mercury at 197 degrees centigrade.

In a similar manner 1,2,3,4,6,7,8,9,13,13,14,14-dodecachloro-1,4:5, 10:6,9—trimethano-11H-benzo(b)-fluorene is prepared by condensing two moles of hexachlorocyclopentadiene with one mole of dicyclopentadiene. The adduct has the assigned structure:

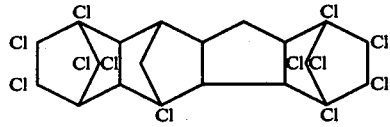

For convenience this compound will be referred to as DCP. DCP melts at about 277 degrees centigrade to 278 degrees centigrade and has a vapor pressure of 0.044 millimeter of mercury at 197 degrees centigrade.

Likewise 1,2,3,4,5,6,7,8,10,10,11,11-dodecachloro-1,4:5,8-dimethanofluorene is prepared by condensing two moles of hexachlorocyclopentadiene with one mole of cyclopentadiene. This adduct has the assigned structure

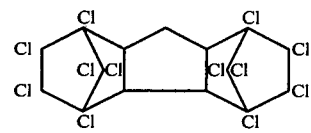

For convenience this adduct will be referred to as CP. CP melts at about 319 degrees centigrade to 322 degrees centigrade and has a vapor pressure of 0.031 millimeter of mercury at 197 degrees centigrade.

The adduct 1,2,3,4,5,6,7,8,12,12,13,13-dodecachloro-1,4:5,8:9,10-trimethano-anthracene is prepared by condensing one mole of the Diels-Alder adduct of cyclopentadiene and acetylene with two moles of hexachlorocyclopentadiene. The resulting adduct has the assigned structure:

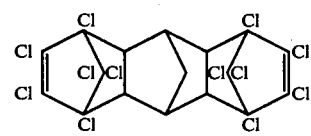

For convenience this adduct will be referred to as BCH. BCH melts at about 340 degrees centigrade and has a vapor pressure of 0.008 millimeter of mercury at 197 degrees centigrade.

The amount of flameproofing agent (halogenated derivative) represents preferably 10 to 25% of the total weight of the composition.

The flame-resistant effect of the halogenated derivatives can be advantageously reinforced by the use of certain inorganic compounds, such as the above mentioned oxides (derivatives of cadmium, arsenic, bismuth and antimony) or also zinc borate. In general, the proportion of inorganic additive does not exceed 50% of the weight of the halogenated derivative.

The polymer blend resins useful in this invention are any blend resin which are at least partially incompatible (insoluble) in the substrate polyamide, and have a melt viscosity lower than the substrate polyamide. By partial incompatibility is meant that the blend resin must not be totally soluble in the polyamide at the concentration in which it is added, but at least some portion of the blend resin must be so incompatible that it cannot ordinarily be maintained as a monophasic homogeneous solution with the matrix resin. Melt viscosity is a measure of the resistance of flow of a fluid. By describing the blend resin as having a lower melt viscosity than the polyamide, is meant that the blend resin must have less resistance to flow in its fluid state than the polyamide when subjected to the same molding conditions. The polymer blend resin must also have acceptable thermal stability to withstand fire retardant system processing temperatures. It has been found that when such partially incompatible, lower melt viscosity, resins are blended with the polyamide, the component with the lower melt viscosity will migrate to the surface of the system under shear conditions. It is believed that this migration has an insulative effect upon that portion of the halogenated derivative normally found at the surface of the polyamide mix with the result being higher arc tracking resistance than can normally be attained when a halogenated derivative fire retardant is used with polyamides. The amount of polymer blend resins preferably added to the system is from 1 to about 12% of the total weight of the system. Diverse polymer blend resins can be used amongst them being oligimers, polymers and copolymers based on polyolefins such as modified or unmodified polyethylene, polypropylene and the like; styrenics such as polystyrene, ABS and the like; polyesters such as polyethylene terephthalate, polybutylene teraphthalate, alkyd resins and the like; polyethers such as polyethylene glycol, polyoxymethylene and the like; polyolefin copolymers such as maleic acid modified polyethylene, maleic anhydride/ethylene diamine grafted polypropylenes, caprolactam/ethylene/maleic anhydride graft copolymers and the like; styrenic copolymers such as styrene-methacrylic acid graft copolymers and the like; polyester-polyamide copolymers such as the condensation polymer of ethylene diamine/dimerized oleic acid/ethylene glycol/ethylene oxide and/or polyethylene glycol, oxides and the like; polyether urea copolymers such as condensation polymers of ethylene oxide/3-amino-1-propanol/diphenyl methane-4,4'-diisocyanate and the like and their chemically modified versions. The aforesaid blend resins can be selectively utilized with the desired polyamide or mixtures thereof providing that such blend resin is at least partially incompatible and has a lower melt viscosity than the selected polyamide. It should be understood that the concentration of blend resin can effect compatibility and that higher concentrations may be applicable for blend resins that are otherwise compatible.

The compositions according to the invention have been previously defined by their essential constituents. These compositions can of course contain those adjuvants, the usage of which is generally recognized. It is thus possible to incorporate into these compositions reinforcing or gelling fillers, such as glass fibres or asbestos fibres, glass microspheres, metal oxides, kaolin, talc, silica, silicates, micas, bentonites or bentones and clays. Glass fibres are the most commonly employed fillers; the diameter of the fibres is generally between 1 and 10μ and their length can vary but generally is between 2 and 6 mm. Articles possessing improved mechanical properties are obtained by using fibres which are sized, for example with epoxy resins, polyester, polyurethanes or vinyl polymers.

When fillers such as those mentioned above are used, their amount can represent up to about 50% of the total weight of the composition.

Other additives can also be used, such as lubricants, agents for increasing the impact strength, antistatic agents and crystallizing agents. These various additives, as well as their use, are widely described in the literature.

The new compositions can be converted into finished or semifinished articles by application of the usual injection or extrusion techniques. In general, the conversion is carried out within a temperature range which can vary from 200° to 320° C. The articles obtained are fire-resistant, on exposure to a flame do not lead to the formation of droplets of molten material, which may be burning, and exhibit an excellent arcing resistance. Although the fields of use of articles of this kind are varied, these articles are thus particularly suitable for uses in the industries concerned with electricity (namely the electrical, electronics, household electrical appliance, radio and automobile industries).

The following examples illustrate the invention:

EXAMPLE 1

A polymer composition was prepared by thoroughly mixing 50 parts by weight of ground (1.0 mm avg.) Nylon 66 polyamide, 30 parts by weight of glass fibers (3/16"×10μ), 16 parts of powdered (2-5 micron) diadduct of hexachlorocyclopentadiene and 1,5 cyclooctadiene (1,5 COD) fire retardant, 4 parts of powdered (1-2 micron) antimony oxide. The thoroughly mixed composition was dried at about 120° C. for approximately 4 hours, then extruded at about 270° C. into spaghetti form. The extrudates were then ground into particles of about 6 mm diameter and again dried at about 120° C. for about 4 hours before injection molding into disks of 4" diameter and ⅛ thickness at about 260°-280° C.

The thus formed disks were subjected to Comparative Tracking Index testing (Arc tracking resistence) in accord with ANSI/ASTM D3638-77.

The surface of a specimen of electrical insulating material, in this case the fabricated disks, is subjected to a low-voltage alternating stress combined with a low current which results from an aqueous contaminant (electrolyte) which is dropped between two opposing electrodes every 30 seconds. The voltage applied across these electrodes is maintained until the current flow between them exceeds a predetermined value which constitutes failure. Additional specimens are tested at other voltages so that a relationship between applied voltage and number of drops to failure can be established through graphical means. The numerical value of the voltage which causes failure with the application of 50 drops of the electrolyte is arbitrarily called the Comparative Tracking Index. This value provides an indication of the relative track resistance of the material. For the instant polymer composition, the Comparative Tracking Index was determined to be 245.

EXAMPLES 2-5

Using the same components, quantities and procedures of Example 1, injection molded disks were prepared with the exception that the polyamide component was Nylon 6 or various blends of Nylon 11, Nylon 612 and Nylon 12 with Nylon 66. The resulting Comparative Tracking Indexes are recorded at Table 1.

TABLE 1

| Example | Polyamide Composition (Parts by Weight) | CTI |
|---|---|---|
| 2 | Nylon 11 (10)–Nylon 66 (40) | 210 |
| 3 | Nylon 612 (10)–Nylon 66 (40) | 240 |
| 4 | Nylon 12 (10)–Nylon 66 (40) | 250 |
| 5 | Nylon 6 (50) | |

EXAMPLES 6-9

Using the same components, quantities and procedure of Example 1, injection molded disks were prepared with the exception that the polyamide component was varied and/or blended with a blend resin of at least partial incompatability and lower melt viscosity selected from polyethylene, polypropylene or the polyester/polyamide composition product of a dicarboxylic acid, a diamine and ethylene oxide tradenamed Emery 9370. The resulting Comparative Tracking Indexes are recorded at Table 2.

TABLE 2

| Example | Polyamide (Parts/weight) | Blend Resin | CTI |
| --- | --- | --- | --- |
| 6 | Nylon 66 (40) | Polyethylene (10) | 300 |
| 7 | Nylon 66 (40) | Polypropylene (10) | 320 |
| 8 | Nylon 66 (45) | Polyester/Polyamide(5) | 440 |
| 9 | Nylon 12 (45) | Polyester/Polyamide(5) | 350 |

EXAMPLES 10-11

Using the same components, quantities and procedure of Example 1, injection molded disks were prepared with the exception that the halogenated fire retardant additive was decabromodiphenyl oxide and in Example 9, the polyamide was additionally blended with the polyester/polyamide of Example 7. The resulting Comparative Tracking Indexes are recorded at Table 3.

TABLE 3

| Example | Polyamide (Parts/Weight) | Blend Resin | CTI |
| --- | --- | --- | --- |
| 10 | Nylon 66 (50) | — | 230 |
| 11 | Nylon 66 (45) | Polyester/Polyamide(5) | 280 |

EXAMPLES 12-13

Using the same components, quantities and procedure of Examples 10-11, injection molded disks were prepared with the exception that the halogenated fire retardant additive was octabromo diphenyl oxide. Comparative Tracking Indexes are recorded at Table 4.

TABLE 4

| Example | Polyamide (Parts/Weight) | Blend Resin | CTI |
| --- | --- | --- | --- |
| 12 | Nylon 66 (50) | — | 260 |
| 13 | Nylon 66 (45) | Polyester/Polyamide(5) | 340 |

EXAMPLES 14-15

Using the same components, quantities and procedures of Examples 10-11, injection molded disks were prepared with the exception that the halogenated fire retardant additive was an ethylene bis tetrabromophthalimide tradenamed Saytex BT93. Comparative Tracking Indexes are recorded at Table 5.

TABLE 5

| Example | Polyamide (Parts/Weight) | Blend Resin | CTI |
| --- | --- | --- | --- |
| 14 | Nylon 66 (50) | — | 210 |
| 15 | Nylon 66 (45) | Polyester/Polyamide(5) | 270 |

EXAMPLES 16-17

Using the same components, quantities and procedure of Examples 10-11, injection molded disks were prepared with the exception that the halogenated fire retardant additive was polydibromophenyl oxide. Comparative Tracking Indexes are recorded at Table 6.

TABLE 6

| Example | Polyamide (Parts/Weight) | Blend Resin | CTI |
| --- | --- | --- | --- |
| 16 | Nylon 66 (50) | — | 210 |
| 17 | Nylon 66 (45) | Polyester/Polyamide(5) | 230 |

EXAMPLE 18

Using the procedure of Example 1, a polyamide composition comprising 47 parts Nylon 612, 12 parts of a polybrominated polystyrene tradenamed Pyrochex 68PB, 4 parts $Sb_2O_3$, 30 parts fiberglass and 7 parts of a lower viscosity polymethyl methacrylate polymer blend resin was used to prepare injection molded disks. The resulting Comparative Tracking Index was >320.

EXAMPLE 19

Using the procedure of Example 1, a polymer composition comprising 28 parts Nylon 11, 22 parts of the diadduct of two moles of hexachlorocyclopentadiene and dicycloheptadiene (BCH) halogenated fire retardant, 5 parts $Sb_2O_3$, 30 parts fiberglass and 15 parts polyethylene terephthalate was used to prepare injection molded disks. The resulting Comparative Tracking Index was >320.

EXAMPLE 20

Using the same components, quantities and procedure of Example 8, injection molded disks are prepared with the exception that the polyamide component is Nylon 6. The resulting Comparative Tracking Index is >400.

What is claimed is:

1. A flame retarded, electrically insulated polyamide polymer composition comprising from about 30-90% by weight of a polyamide, from about 5-30% by weight of a halogenated organic flame retardant selected from the group consisting of chlorinated and brominated derivatives of monocyclic or polycyclic hydrocarbons of aliphatic or aromatic character and from about 1 to about 20% by weight of a polymer blend resin said blend resin having a lower melt viscosity than said polyamide, having acceptable thermal stability to withstand fire retardant system processing temperatures and being at least partly insoluble in said polyamide so that said blend resin cannot ordinarily be maintained as a monophasic homogeneous solution with said polyamide.

2. The polyamide composition of claim 1 wherein said polyamide is selected from the group consisting of Nylon 6, Nylon 11, Nylon 12, Nylon 66, Nylon 611, Nylon 612 and mixtures thereof.

3. The polyamide composition of claims 1 or 2 wherein said halogenated organic flame retardant is selected from chlorinated or brominated, monocyclic or polycyclic hydrocarbons.

4. The polyamide composition of claim 1 wherein said halogenated organic flame retardant is selected from the group consisting of octabromodiphenyl oxide, deca/bromodiphenyl oxide, tetrabrominated bisphenol, decabromotoluene, polybrominated styrene, alkylene tetrabromophthalimide, chlorinated organic compounds of the formula;

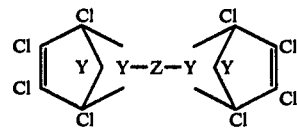

wherein Y is selected from the group consisting of chlorine, fluorine, alkyl and alkoxy of 1-10 carbon atoms; and Z is a tetravalent cyclic hydrocarbon of 5 to 18 carbon atoms and mixtures thereof.

5. The polyamide composition of claims 2 or 4 wherein said halogenated organic is a Diels-Alder adduct of hexachlorocyclopentadiene and 1,5-cyclooctadiene.

6. The polyamide composition of claims 2 or 4 wherein said halogenated organic flame retardant is octabromodiphenyl oxide.

7. The polyamide composition of claims 2 or 4 wherein said halogenated organic flame retardant is decabromodiphenyl oxide.

8. The polyamide composition of claims 2 or 4 wherein said halogenated organic flame retardant is selected from tetrabrominated bisphenol, decabromotoluene, polybrominated styrene, alkylene tetrabromophthalimide and mixtures thereof.

9. The polyamide composition of claims 2 or 4 wherein said halogenated organic flame retardant is a Diels-Alder adduct of hexachlorocyclopentadiene and a polyunsaturated compound selected from the group consisting of methyl cyclopentadiene, cyclopentadiene, dicyclopentadiene, bicyclo(2.2.1) heptadiene, 1,5-cyclooctadiene, cyclodecadiene, cyclododecadiene, furan, thiophene and mixtures thereof.

10. The polyamide composition of claims 2 or 4 wherein the polymer blend resin is selected from the group consisting of oligimers, polymers and copolymers based on polyolefins, oxdized polyolefins, styrenics, polyesters, polyethers, polyolefin copolymers, styrenic copolymers, polyester-polyamide copolymers, polyetherurea copolymers and mixtures thereof.

11. The polyamide composition of claims 2 or 4 wherein the polymer blend resin is a polyester-polyamide condensation product of a dicarboxylic acid, a diamine and ethylene oxide.

12. The polyamide composition of claims 2 or 4 wherein the polymer blend resin is a polyester-polyamide condensation product of a dicarboxylic acid, a diamine and ethylene oxide and the halogenated organic flame retardant is a Diels-Alder adduct of hexachlorocyclopentadiene and 1,5-cyclooctadiene.

13. The polyamide composition of claims 2 or 4 wherein the polymer blend resin is selected from the group consisting of polyethylene, polypropylene, polymethylmethacrylate and polyethylene teraphthalate.

14. The polyamide comosition of claims 2 or 4 wherein the polyamide is Nylon 66.

15. A method of increasing the arc tracking resistance of polyamide compositions containing from about 30 to about 90% by weight of polyamide and about 5 to about 30% by weight of a halogenated organic flame retardant selected from the group consisting of chlorinated and brominated derivatives of monocyclic or polycyclic hydrocarbons of aliphatic or aromatic character, comprising incorporating therein from about 1 to about 20% by weight, based on the total polyamide composition, of a polymer blend resin which has a lower melt viscosity than said polyamide, has acceptable thermal stability to withstand fire retardant system processing temperatures and is at least partly insoluble in said polyamide so that said blend resin cannot ordinarily be maintained as a monophasic homogeneous solution with said polyamide.

16. The method of claim 15 wherein said halogenated organic flame retardant is a Diels-Alder adduct of hexachlorocyclopentadiene and a polyunsaturated compound selected from the group consisting of methyl cyclopentadiene, cyclopentadiene, dicyclopentadiene, bicyclo(2.2.1) hexadiene, 1,5-cyclooctadiene, cyclodecadiene, cyclododecadiene, furan, thiophene and mixtures thereof.

17. The method of claims 15 or 16 wherein said polymer blend resin is selected from the group consisting of oligimers, polymers and copolymers based on polyolefins, styrenics, polyesters, polyethers, polyolefin copolymers, styrenic copolymers, polyester-polyamide copolymers, polyetherurea copolymers and mixtures thereof.

18. The method of claim 15 wherein said halogenated organic flame retardant is a Diels-Alder adduct of hexachlorocyclopentadiene and 1,5-cyclooctadiene and the polymer blend resin is a polyester-polyamide condensation product of a dicarboxylic acid, a diamine and ethylene oxide.

19. An article at least part of which comprises an electrically insulative halogenated organic flame retarded polymer component said polymer component comprising from about 30–90% by weight of a polyamide, from about 5 to about 30% by weight of a halogenated organic flame retardant selected from the group consisting of chlorinated and brominated derivatives of monocyclic or polycyclic hydrocarbons or aliphatic or aromatic character and from about 1 to about 20% by weight of a polymer blend resin which has a lower melt viscosity than said polyamide, has acceptable thermal stability to withstand fire retardant system processing temperature and is at least partly insoluble in said polyamide so that said blend resin cannot ordinarily be maintained as a monophasic homogeneous solution with said polyamide.

20. The article of claim 19 wherein said polyamide is selected from the group consisting of Nylon 6, Nylon 11, Nylon 12, Nylon 66, Nylon 611, Nylon 612 and mixtures thereof, said halogenated organic is a Diels-Alder adduct of hexachlorocyclopentadiene and 1,5-cyclooctadiene, and the polymer blend resin is a polyester-polyamide condensation product of a dicarboxylic acid, a diamine and ethylene oxide.

* * * * *